United States Patent
Patel et al.

(10) Patent No.: US 8,510,752 B2
(45) Date of Patent: Aug. 13, 2013

(54) SYSTEM AND METHOD FOR DATA MANAGEMENT OF EMBEDDED SYSTEMS

(75) Inventors: Sanjay Patel, Troy, MI (US); Phanindranath Vedula, Troy, MI (US); William Allen Hinton, Sterling Heights, MI (US); Sunayana Bhan, Troy, MI (US); Ashok Sivaram, Troy, MI (US); Tanweer Khan, Pune Infotech Park (IN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1338 days.

(21) Appl. No.: 11/848,957

(22) Filed: Aug. 31, 2007

(65) Prior Publication Data
US 2009/0064187 A1    Mar. 5, 2009

(51) Int. Cl.
*G06F 3/00* (2006.01)
(52) U.S. Cl.
USPC .............................. 719/316; 719/313; 719/315
(58) Field of Classification Search
None
See application file for complete search history.

(56) References Cited

U.S. PATENT DOCUMENTS

| 7,426,721 | B1* | 9/2008 | Saulpaugh et al. | 719/316 |
|---|---|---|---|---|
| 8,150,988 | B2* | 4/2012 | Pardo-Castellote et al. | 719/315 |
| 2004/0162741 | A1* | 8/2004 | Flaxer et al. | 705/7 |
| 2007/0106486 | A1* | 5/2007 | Pascarella et al. | 703/6 |
| 2008/0033785 | A1* | 2/2008 | Anke | 705/10 |
| 2010/0122266 | A1* | 5/2010 | Dufosse et al. | 719/313 |

FOREIGN PATENT DOCUMENTS
WO    WO 9531780 A1    11/1995

OTHER PUBLICATIONS

"POP method: An Approach to Enhance the Security and Privacy of RFID Systems Used in Product Lifecycle with an Anonymous Ownership Transferring Mechanism", Koralalage, 2007, pp. 1-6.*
"Interface heterogeneous PDM system by PLM services for design collaboration", Gunpinar, 2006, pp. 1-6.*
"mySAP Product Lifecycle Management cPDm Program", CIMdata Program Review, 2001, pp. 1-46.*

* cited by examiner

*Primary Examiner* — Tuan Dao (57) ABSTRACT

A system, method, and computer program manage embedded component information for a product design in a product lifecycle management (PLM) environment. The method includes displaying at least one message object and associating the at least one message object with a signal object.

7 Claims, 9 Drawing Sheets

SYSTEM AND METHOD FOR DATA MANAGEMENT OF EMBEDDED SYSTEMS

TECHNICAL FIELD

The presently preferred embodiment of the innovations described herein relate generally to software applications. More specifically, the presently preferred embodiment relates to managing data among embedded components in a product lifecycle management system.

BACKGROUND

Embedded software runs on systems that interact with the physical world in real time. These systems, often referred to as embedded systems, are designed to perform specific tasks with optimal efficiency and possess certain unique characteristics. A characteristic is that embedded systems should have long life because they often reside in machines that are expected to run continuously for years without errors. Another characteristic is that errors in embedded systems are costly. For instance, if a temperature sensor system fails in motors or transformers, they get over heated and fail. Hence, most of the embedded systems are programmed and tested to satisfy zero error tolerance. And another characteristic is that embedded systems should be extremely reliable during operation. Some of the reliability features of embedded systems are: a) safety b) ease of repair, c) ease of shutting down and automatic turn on. Embedded systems should not affect other controllers when they fail. Still another characteristic is that embedded systems need to react instantaneously for any input. The embedded system can be outside the reach of humans (down an oil well borehole, or launched into outer space, etc.), so the embedded system must restart itself even if catastrophic data corruption takes place. And still another characteristic of embedded systems, is that they interact with several systems simultaneously and should be designed to concurrently react with many systems in real time with out any problems. Yet another characteristic is they constitute many interdependent components such as hardware, software, firmware and complex networks to exchange messages. This interdependency allows embedded systems to communicate with other systems. For example in a vehicle, a cruise control system communicates to power train to maintain the set speed.

Further, embedded systems are used to control and/or monitor the operation of machinery and can be found in a variety of product structures executing a variety of applications. In recent years, embedded systems experienced exponential growth due to the ever increasing customer demands with changing product structure requirements. An important development in embedded systems is networking. Advances in wireless technology coupled with low cost and compact size integrated chips helped rapid growth of embedded network systems involving volumes of messages. The networks enable the embedded systems to communicate with each other and also with the physical world. A typical product structure that has an embedded system contains one or more buses that continuously transmit volumes of messages and signals across various components. It is very burdensome to the multitude of developers and designers working on an product structure to track and maintain the embedded system components that go into the product structure while staying with model and other changes that occur throughout the life cycle of a product. Likewise it is difficult to manage the effect a design change has on a network bus or message as they relate to the product structure.

What is needed is a system and method for message data management of embedded systems as part of the over all embedded systems model.

SUMMARY

To achieve the foregoing, and in accordance with the purpose of the presently preferred embodiment as broadly described herein, the present application provides a method for managing embedded component information for a product design in a PLM environment, comprising displaying at least one message object; and associating said at least one message object with a signal object. The method, further comprising auditing said at least one message object. The method, whereby said association satisfies a compatibility rules of signal objects.

Another advantage of the presently preferred embodiment is to provide a method for managing embedded component information for a product design in a PLM environment, comprising identifying a plurality of message data; associating a transmitting component and a receiving component with at least one of said plurality of message data; and indicating a connection item for at least one of said plurality of message data, wherein said connection item is a carrier of said plurality of said message data. The method, further comprising auditing said plurality of message data.

And another advantage of the presently preferred embodiment is to provide a method of providing an embedded system manager for a product design, comprising categorizing a plurality of message data; and generating a compatibility list of a plurality of network devices for said plurality of message data. The method, further comprising auditing said plurality of message data.

Still another advantage of the presently preferred embodiment is to provide a computer-program product tangibly embodied in a machine readable medium to perform a method for managing embedded component information for a product design in a PLM environment, comprising instructions operable to cause a computer to display at least one message object; and associate said at least one message object with a signal object. The computer-program product, whereby said association satisfies a compatibility signal object list.

Yet another advantage of the presently preferred embodiment is to provide a system comprising a windowed environment; and a logical bill of materials application using said windowed environment that includes a hierarchical catalog of a plurality of embedded components having at least one message object; and a system catalog that associates said at least one message object with at least one of a plurality of transmitting components, a plurality of receiving components and a plurality of signal transmitters.

And yet another advantage of the presently preferred embodiment is to provide a data processing system having at least a processor and accessible memory to implement a method for managing objects within an application, comprising means for displaying at least one message object; and means for associating said at least one message object with a signal object.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 8:
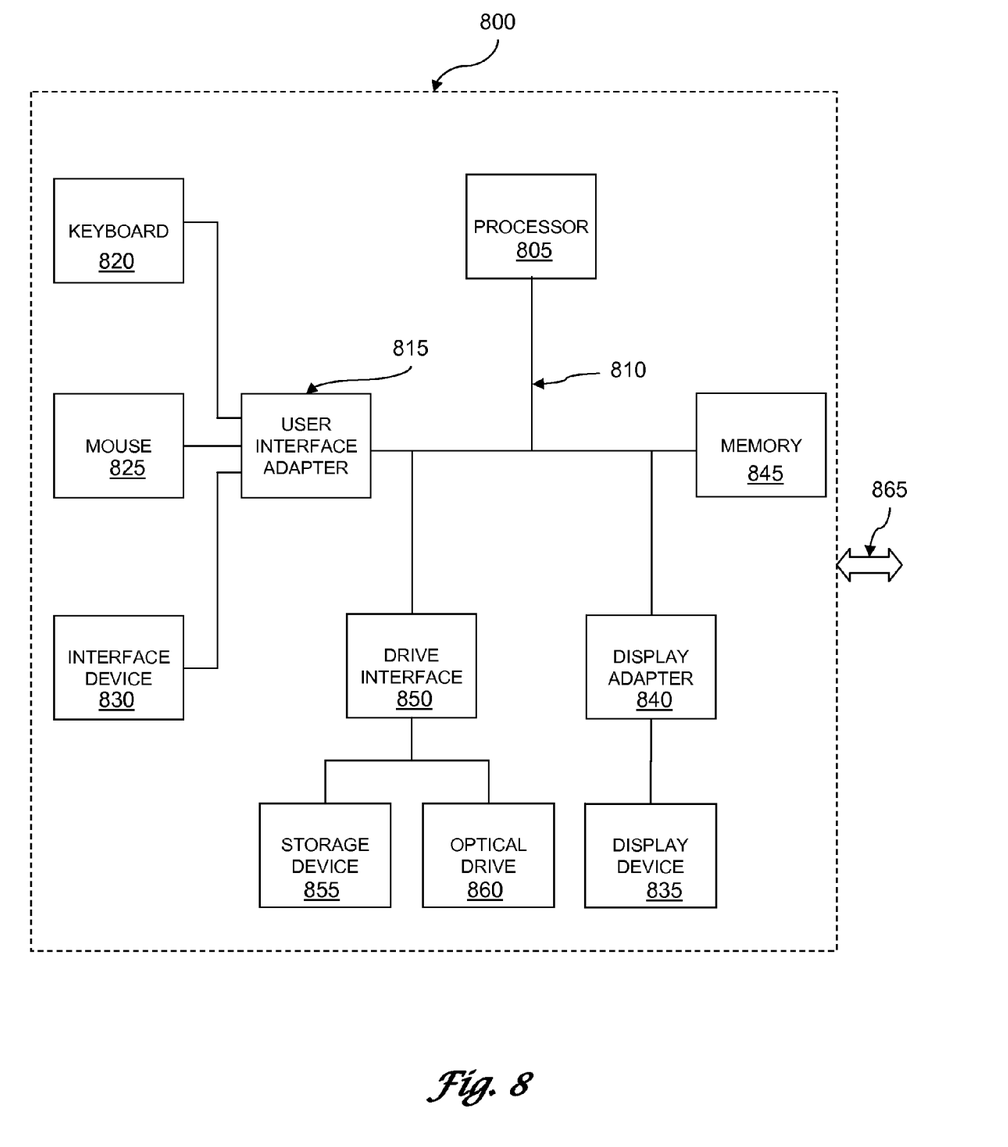
FIG. 8 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for managing data in an embedded product life cycle system. FIG. 8 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Now therefore, in accordance with the presently preferred embodiment, an operating system executes on a computer, such as a general-purpose personal computer. Referring to FIG. 8, an exemplary system for implementing the presently preferred embodiment includes a general-purpose computing device in the form of a computer 800, such as a desktop or laptop computer, including a plurality of related peripheral devices (not depicted). The computer 800 includes a microprocessor 805 and a bus 810 employed to connect and enable communication between the microprocessor 805 and a plurality of components of the computer 800 in accordance with known techniques. The bus 810 may be any of several types of bus structures including a memory bus or memory controller, a peripheral bus, and a local bus using any of a variety of bus architectures. The computer 800 typically includes a user interface adapter 815, which connects the microprocessor 805 via the bus 810 to one or more interface devices, such as a keyboard 820, mouse 825, and/or other interface devices 830, which can be any user interface device, such as a touch sensitive screen, digitized pen entry pad, etc. The bus 810 also connects a display device 835, such as an LCD screen or monitor, to the microprocessor 805 via a display adapter 840. The bus 810 also connects the microprocessor 805 to a memory 845, which can include ROM, RAM, etc.

The computer 800 further includes a drive interface 850 that couples at least one storage device 855 and/or at least one optical drive 860 to the bus. The storage device 855 can include a hard disk drive, not shown, for reading and writing to a disk, a magnetic disk drive, not shown, for reading from or writing to a removable magnetic disk drive. Likewise the optical drive 860 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 800.

The computer 800 can communicate via a communications channel 865 with other computers or networks of computers. The computer 800 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 845 of the computer 800. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
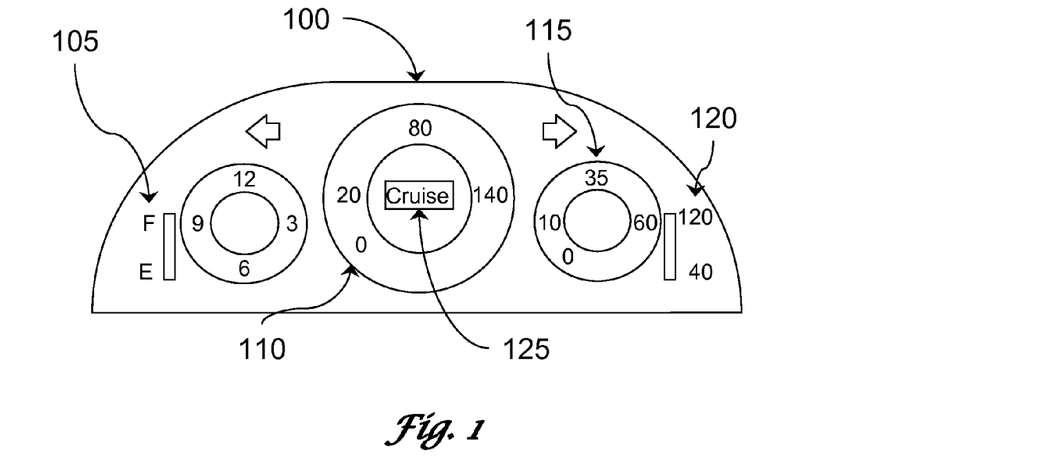
FIG. 1 is an illustration of an instrument panel on a dash of a car.

FIG. 1 is an illustration of an instrument panel on a dash of a car. Referring to FIG. 1, an automobile has a dash 100 with various display components. The display components can include a fuel gauge 105, a speedometer 110, a tachometer 115, and a thermometer 120. Also the dash 100 is able to display messages to a driver to inform the driver of various conditions of the vehicle. A sample is the word CRUISE shown on a Cruise Message Display 125, if the cruise control is engaged, so that the driver has information useful for driving the car.

Figure 2:
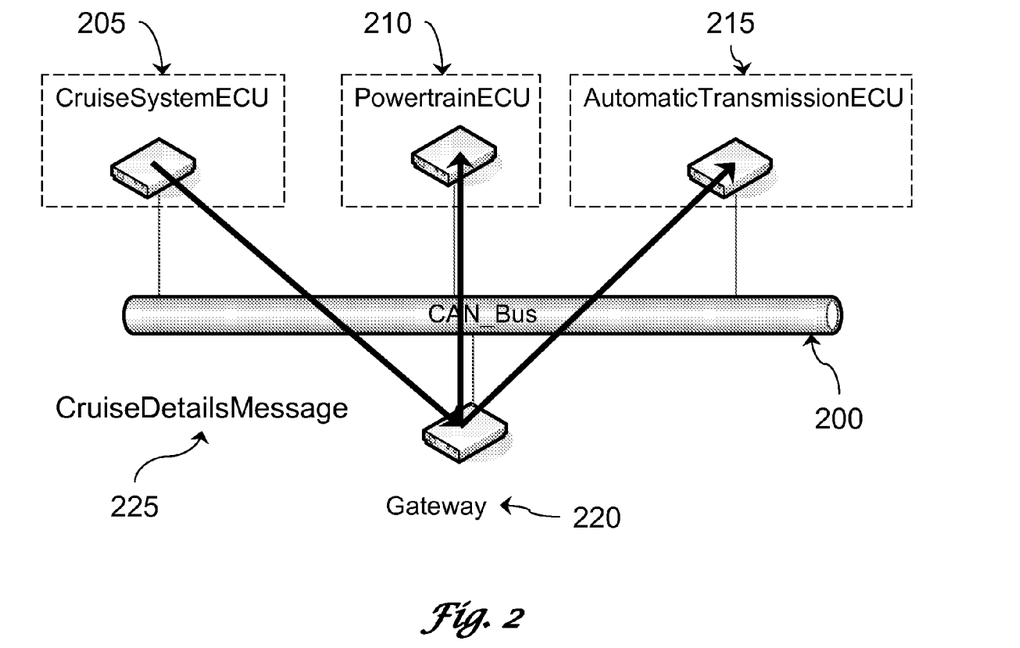
FIG. 2 is an illustration of an embedded system in a car.

FIG. 2 is an illustration of an embedded system in a car. Unbeknownst to the driver is the inter-relationship of the various components comprising the car necessary to display CRUISE, particularly referring to the engine controller units (ECUs) and the network. A further abstraction of this concept is the impact various ECUs have on the network for any given message, and the various relationships of those components.

Referring to FIG. 2, the car is able to have a network of messages that travel along a bus 200. The bus 200 connects various ECUs such as a CruiseSystemECU 205, a PowerTrainECU 210, and an AutomaticTransmissionECU 215 that all communicate to each other through a gateway 220, for example. Returning to the Cruise Message Display 125 example, the driver commonly depresses a Cruise Control Button (not depicted) with the purpose of engaging the car's cruise control feature. The pressing of the Cruise Control Button to the ON position sends a CruiseDetailsMessage 225 that is part of the CruiseSystemECU 205 along the bus 200 though the gateway 220 to the PowertrainECU 210 and the AutomaticTransmissionECU 215, for example. As a further abstraction of this example, ensuring the CruiseDetailsMessage 225 communicates correctly with the CruiseSystemECU 205, that in turn communicates properly with the gateway 220 along the bus 200 to the other ECUs 210,215, in the particular driver's car is part of a highly specialized product structure that may change the message for any variety of reasons, such as Manual versus Automatic transmission, or all-wheel drive versus front-wheel drive powertrain. In the current automotive manufacturing environment is, the multitude of parts comprising a car are designed and developed by various entities, e.g., first-tier suppliers, and the various entities spend time to deliver the embedded system to match the requirements of the car.

Product Design

Figure 3:
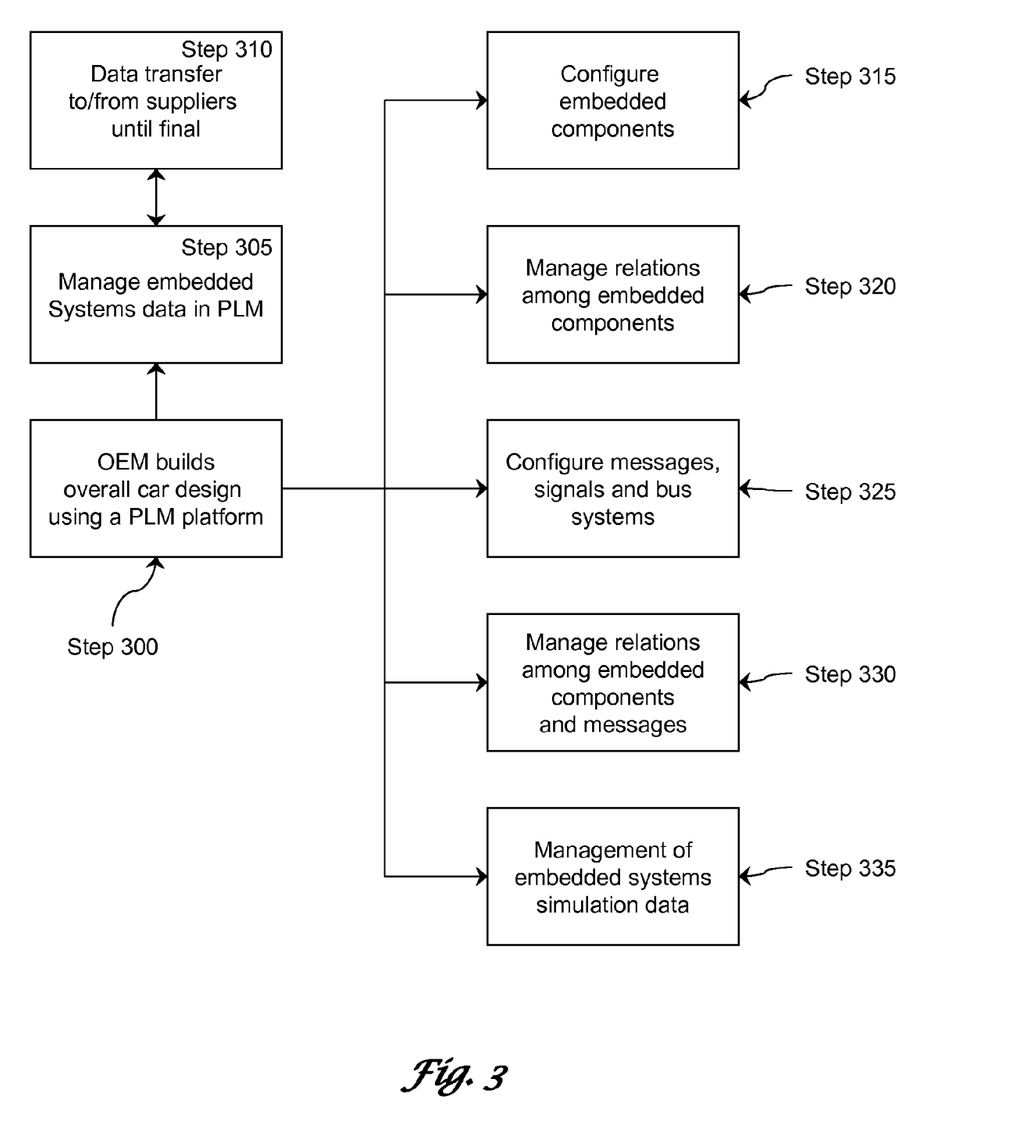
FIG. 3 shows an example workflow for an original equipment manufacturer for managing embedded systems data and message data

FIG. 3 shows an example workflow for an original equipment manufacturer for managing embedded systems data and message data. Referring to FIG. 3, the original equipment manufacturer (OEM) builds an overall car design using a product lifecycle management (PLM) platform (Step 300). The OEM configures all embedded systems and network systems according to detailed specifications (Step 305). The OEM then typically outsources the design and manufacture of the embedded systems to suppliers (Step 310). The suppliers design the necessary systems and provide the full embedded systems data back to OEMs (Step 310). The data transfer between OEMs and suppliers continues until an embedded system design is finalized. Once the design is finalized, the OEM can configure embedded components (Step 315), manage relations among embedded components (Step 320), configure messages/signals/bus-systems (Step 325), manage relations among embedded components and messages (Step 330), and manage embedded system simulation data (Step 335). Of course, it is understood that relations and message information before outsourcing can be refined further by the supplier or OEM during design, Step 310. The presently preferred embodiment can also be used by the designer to select embedded components without any knowledge of the messages requirements based solely on a compatibility list that is used to align embedded devices with congruent messages, and vice versa.

Operation

Figure 4A:
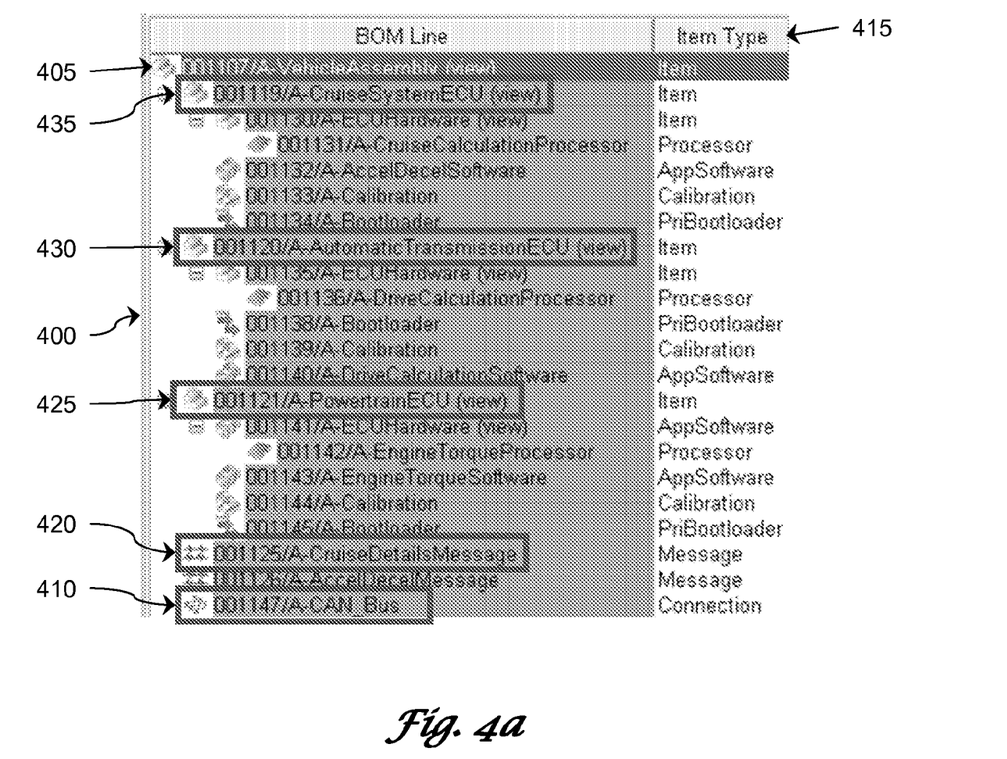
FIGS. 4a-4d are illustrations of a bill of material for a product.
Figure 4B:
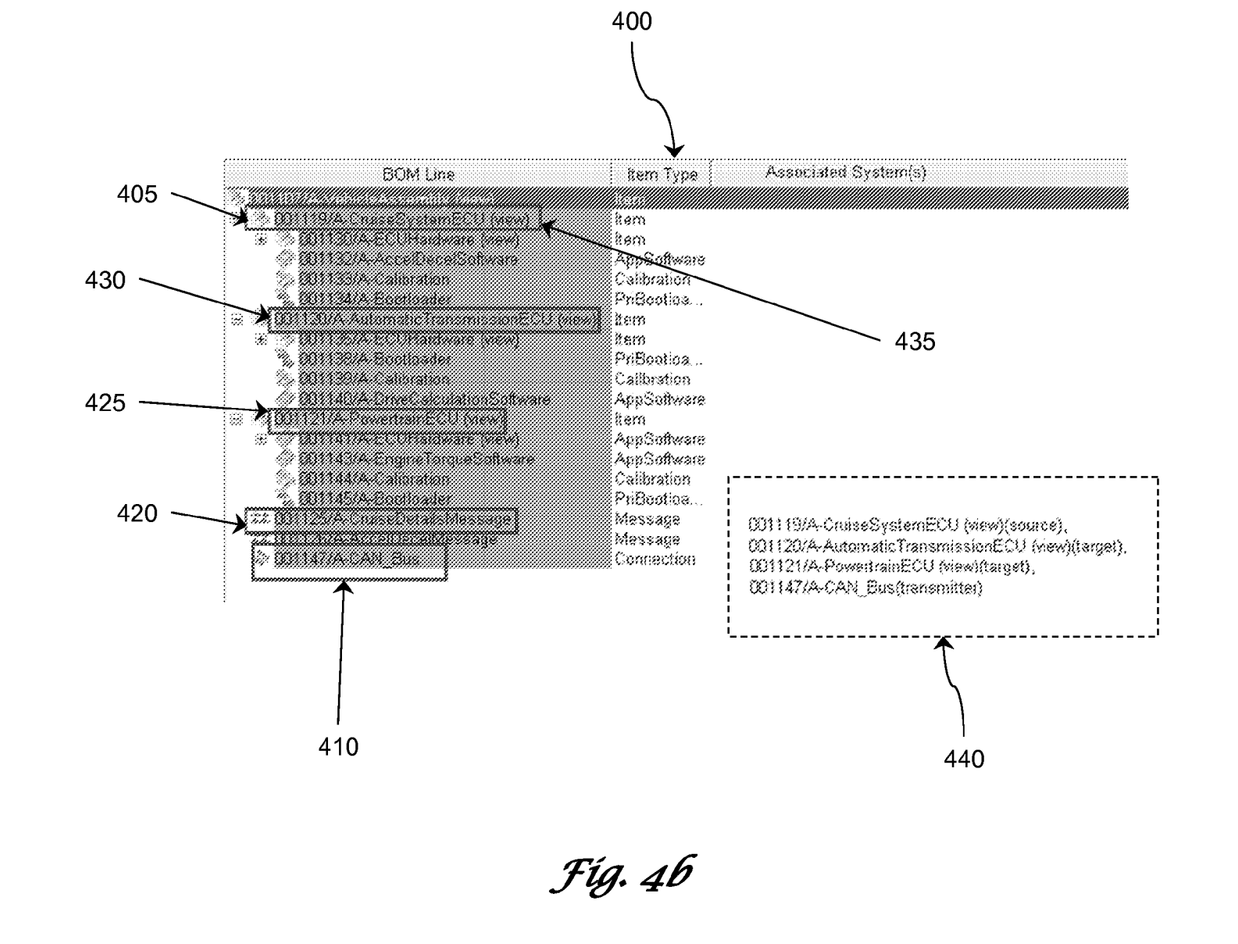

FIGS. 4a & 4b are an illustration of a bill of material for a product. Referring to FIG. 4a, a sample product structure representation with a bill of material (BOM) 400 has several embedded systems representations for a Vehicle Assembly representation 405 as determined from Step 305, above For example, the OEM/supplier may identify on the BOM 400 a Controller Area Network (CAN) bus line-item 410 having a connection type for messages in the embedded system for the Vehicle Assembly representation 405 as determined in Step 325. Such an identification occurs by selecting "Connection" on a drop-down menu list under an Item Type column 415 heading. Next, the OEM/supplier may identify on the BOM 400 a CruiseDetailsMessage line-item 420 that is a sufficient message in the embedded system for the Vehicle Assembly representation 405. An AccelDecelMessage line-item may also be specified as a necessary message to have information for the embedded system on the Vehicle Assembly representation 405 related to the acceleration and deceleration of the vehicle, for example. Having the message flow illustrated in FIG. 2, the OEM/supplier may identify further sufficient components as line-items in the Vehicle Assembly representation 405. For example, a PowertrainECU line-item 425, an AutomaticTransmissionECU line-item 430, or a CruiseSystemECU line-item 435. These sufficient components are identified as "Items" in the Item Type column 415 that have sub-components of Item Types like processor, AppSoftware, Calibration, PriBootloader, for example. With the use of various sub-components, the OEM/supplier and other users are able to select, by commonly understood selection methods, which of those sub-components comprise the Item or an Item of Items. Referring to FIG. 4a in greater detail, the CruiseSystemECU line-item 435 has a ECUHardware line-item, an AccelDecelSoftware line-item, a Calibration line-item, and a Bootloader line-item, where the ECUHardware has a CruiseCalculationProcessor, for example.

Figure 4C:
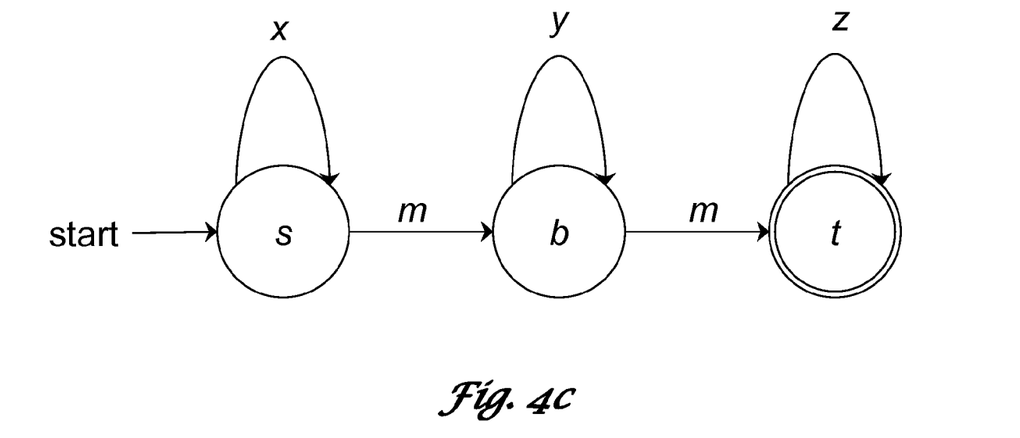

The presently preferred embodiment also provides the OEM/supplier, for example, the ability to manage messages in greater detail. Referring to FIG. 4b to illustrate this message management, the Vehicle Assembly representation 405 has the CruiseDetailsMessage line-item 420 that has to be associated to various Item Types within the BOM 400 at an associated system location 440. The design intent is to have the CruiseDetailsMessage 225 transmit along the CAN_Bus 200 from the CruiseSystemECU 205 to either the AutomaticTrasnmissionECU 215 or the PowertrainECU 210, or both. Keeping with the design intent at the associated system location is illustrated the CruiseSystemECU line-item 435 as a source, or receiving component, for the CruiseDetailsMessage line-item 420, the CAN_Bus line-item 410 as a bus, and both the AutomaticTransmissionECU line-item 430 and the PowertrainECU line-item 425 as a target, or transmitting components. The presently preferred embodiment of the above illustration is according to the following equation:

$$\forall m, \exists \{b,t,s\} : \exists b \geq 1, t \geq 1, s \geq 1 \qquad \text{Eq. 1}$$

where m is message, b is bus, t is target and s is source. Put another way, for all messages, there exists a bus, a target, and a source, such that there is at least one bus, at least one target, and at least one source. FIG. 4c is a transition diagram that illustrates where the message m starts with at least one source, proceeds along at least one bus, to at least one target.

Figure 4D:
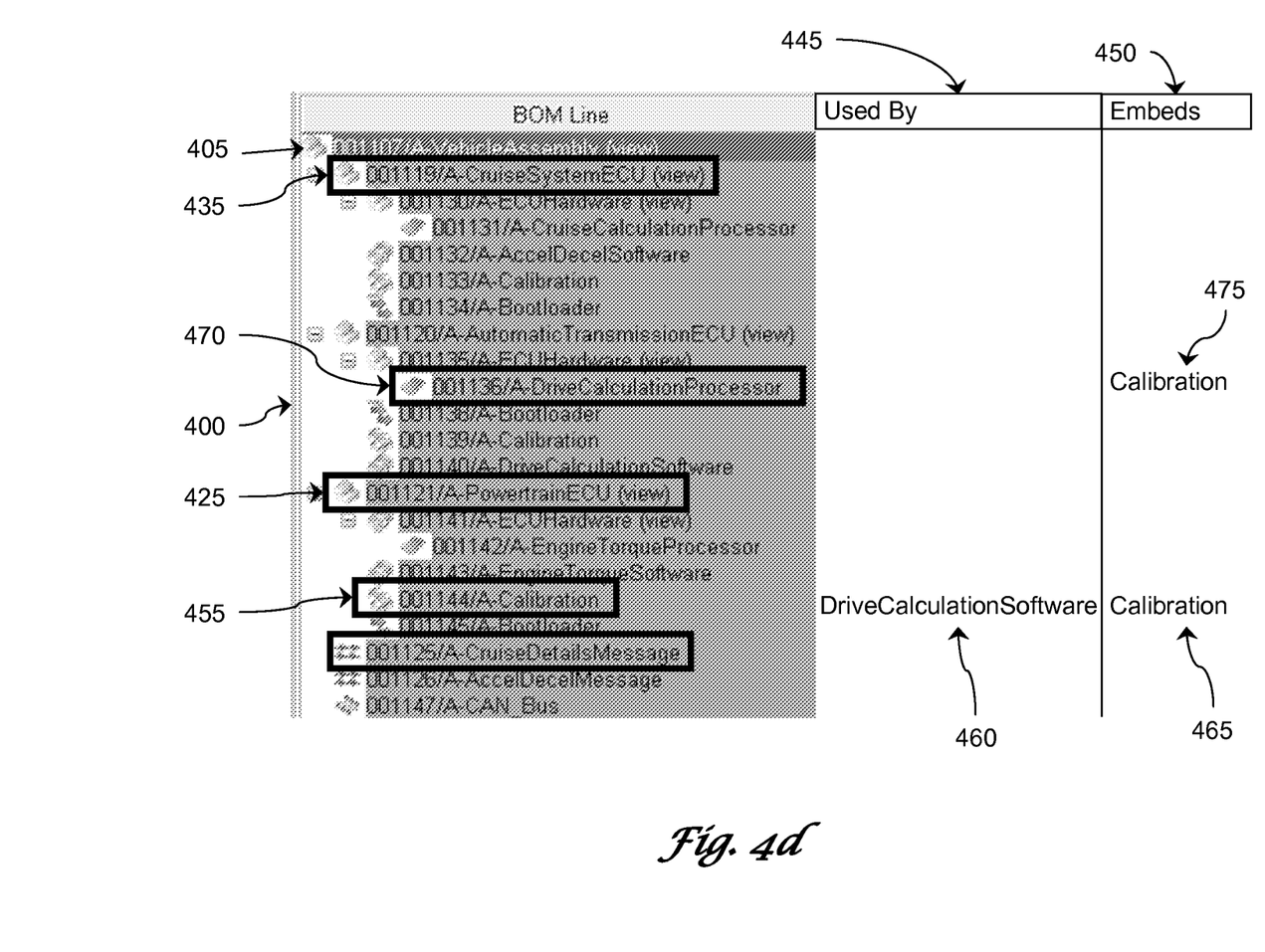
Figure 5:
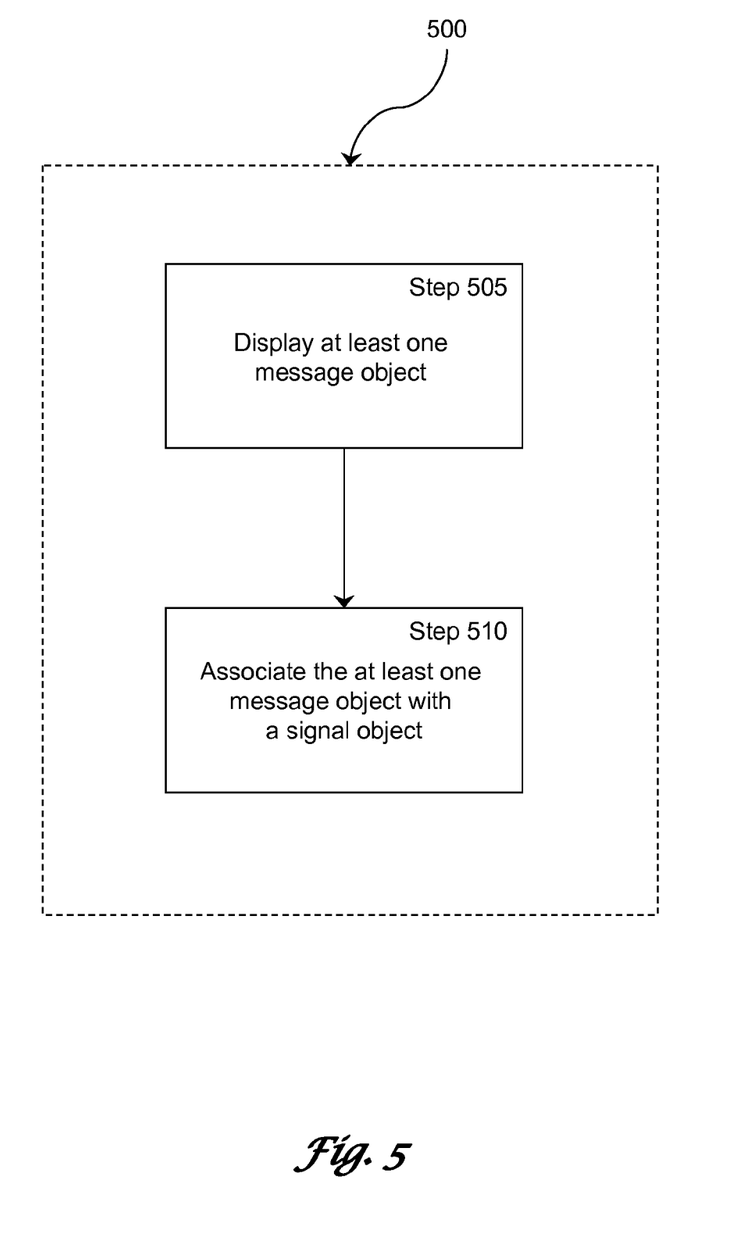
FIG. 5 is a flow diagram depicting a process implementing a message data management system for embedded components.

FIG. 4d is an illustration of a bill of material for a product in an alternate embodiment. Following Step 330, the OEM/supplier may manage any number of relationships, like processor-software, software-software, and/or processor-processor, between and among the various embedded component line-items. Referring to FIG. 5, a "Used By" column 445 denotes the software-software relationship as well as the processor-processor relationship. A "Embeds" column 450 denotes the processor-software relationship. Returning to the original example, a Calibration software line-item 455 is identified as a sub-component to the PowertrainECU line-item 425. The Calibration software line-item 455 can have the software-software relationship as indicated at 460. The Calibration software line-item 455 can also have the processor-software relationship as indicated at 465. Likewise, a DriveCalculationProcessor line-item 470 can have a processor-software relationship by embedding the Calibration software line-item 455, as indicated at 475. If during Step 335, a faulty processor is identified, for example, a 001136/A-DriveCalculationProcessor having the BOM 400 line-item at 470, then the dependent relationships for example, the Calibration software line-item 475, triggers and identifies the affected embedded components for modification and/or correction.
Summary FIG. 5 is a flow diagram depicting a process implementing a message data management system for embedded components. Referring to FIG. 5, a method for managing embedded component information for a product design in a PLM environment, generally illustrated at 500, starts with displaying at least one data message object (Step 505). Next, associate the at least one data message object with a signal component (Step 510). This association satisfies a compatibility component list.

Figure 6:
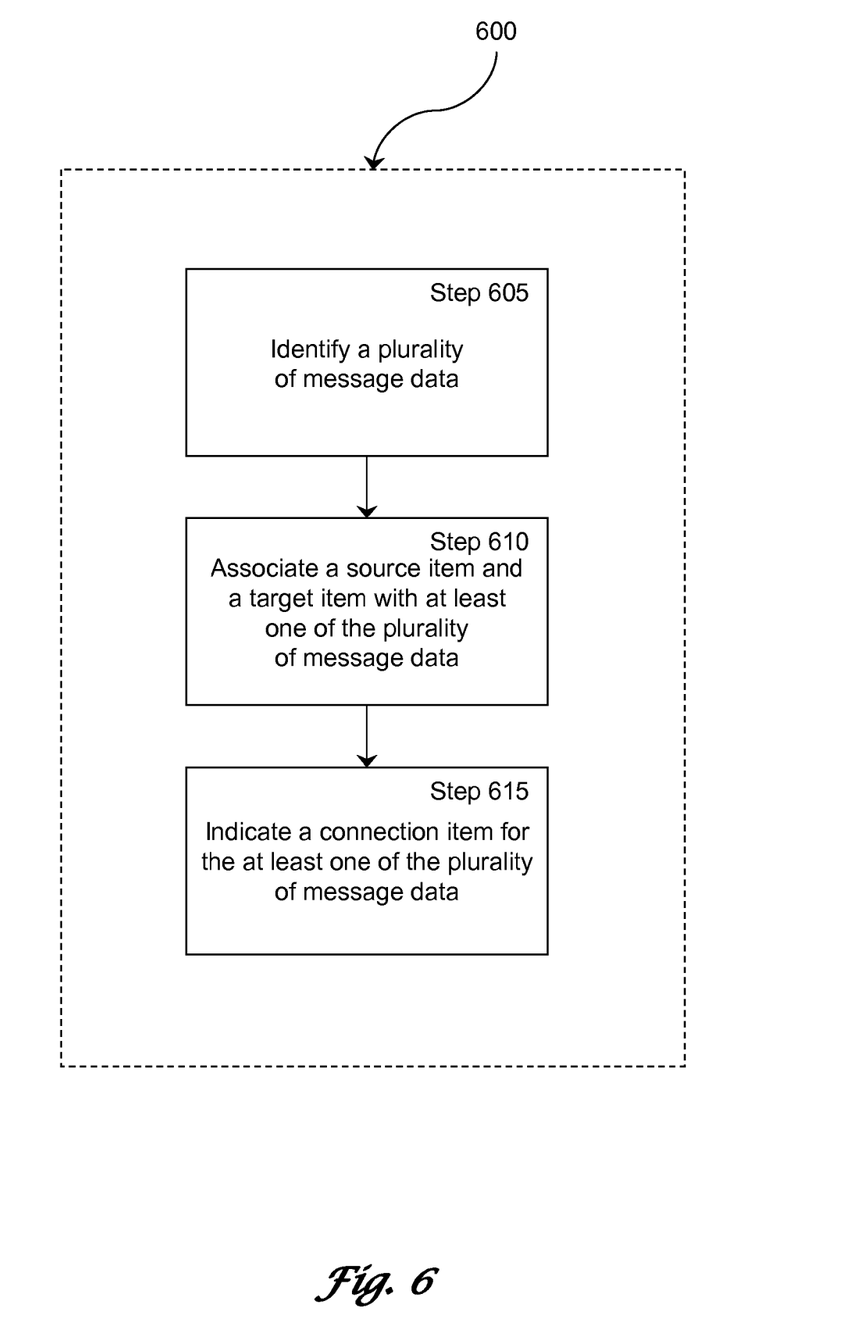
FIG. 6 is a flow diagram depicting a process implementing a message data management system for embedded components.

FIG. 6 is a flow diagram depicting a process implementing a message data management system for embedded components. Referring to FIG. 6, a method for managing embedded component information for a product design in a PLM environment, generally illustrated at 600, starts with identifying a plurality of message data (Step 605). Next, associate a source item and a target item with at least one of the plurality of message data (Step 610). Then indicate a connection item for the at least one of the plurality of message data (Step 615).

Figure 7:
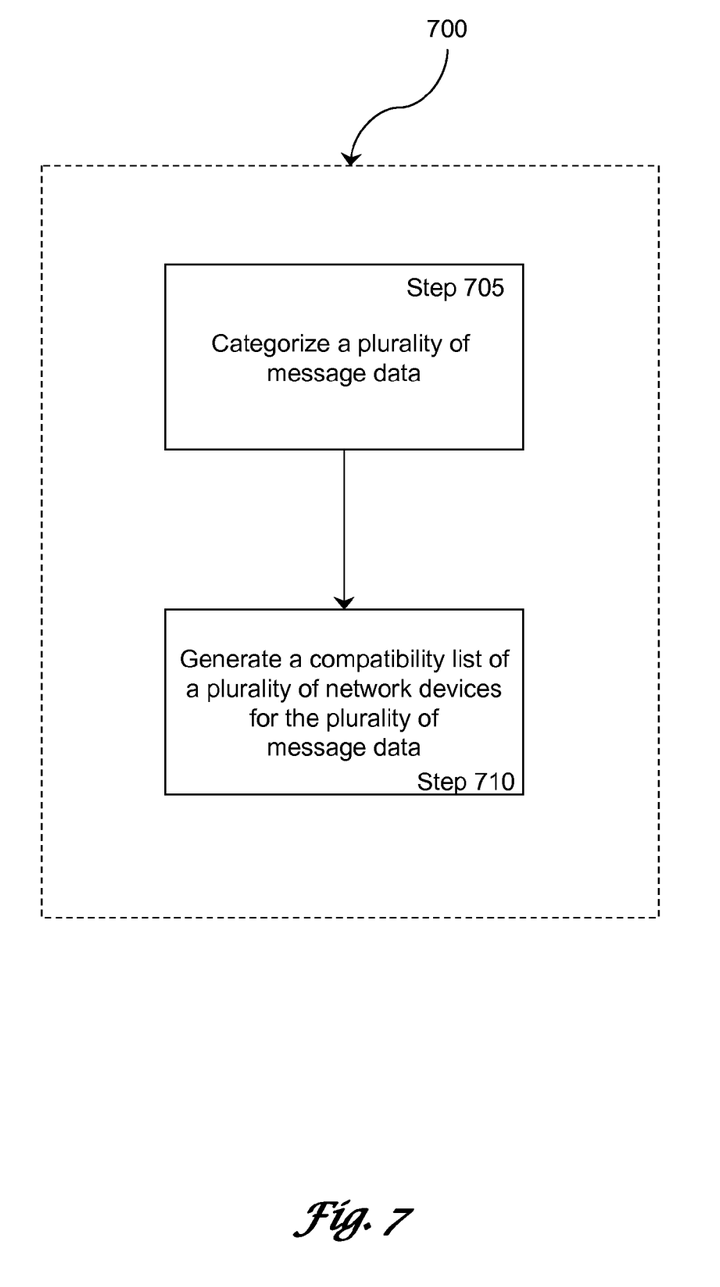
FIG. 7 is a flow diagram depicting a process implementing a message data management system for embedded components.

FIG. 7 is a flow diagram depicting a process implementing a message data management system for embedded components. Referring to FIG. 7, a method of providing an embedded system manager for a product design, generally illustrated at 700, starts with categorizing a plurality of message data (Step 705). And then the method generates a compatibility list of a plurality of network devise for the plurality of message data (Step 710).
Conclusion The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method for managing embedded component information for a product design in a product lifecycle management (PLM) environment, comprising:
   displaying at least one message object associated with a first embedded component, wherein the first embedded component is embedded within a product built in accordance with the product design;
   associating, using a processor, said at least one message object with a signal object using a compatibility list that defines component relationships in the product design; and
   sending the signal object to a second embedded component associated with the signal object and embedded within the product using a bus that provides a connection between the first embedded component and the second embedded component,
   wherein the first and second embedded components are different engine controller units and wherein sending the signal object causes the second embedded component to perform an action associated with the message object,
   wherein selection of the first embedded component to be included in the product design is made without knowledge of messages requirements in the product design, and
   wherein the first and second embedded components are developed by different entities.

2. The method of claim 1, further comprising auditing said at least one message object.

3. The method of claim 1 further comprising:
   representing a plurality of embedded systems for the product design including the first and second embedded components and the bus using a bill of material; and
   including connection types for transmitting messages between embedded systems in the bill of material.

4. A computer-program product tangibly embodied in a non-transitory machine readable medium to perform a method for managing embedded component information for a product design in a product lifecycle management (PLM) environment, comprising instructions operable to cause a computer to:
   display at least one message object associated with a first embedded component, wherein the first embedded component is embedded within a product built in accordance with the product design;
   associate said at least one message object with a signal object using a compatibility list that defines component relationships in the product design; and
   send the signal object to a second embedded component associated with the signal object and embedded within the product using a bus that provides a connection between the first embedded component and the second embedded component,
   wherein the first and second embedded components are different engine controller units and wherein sending the signal object causes the second embedded component to perform an action associated with the message object,
   wherein selection of the first embedded component to be included in the product design is made without knowledge of messages requirements in the product design, and
   wherein the first and second embedded components are developed by different entities.

5. The computer-program product of claim 4 further comprising instructions operable to cause a computer to:
represent a plurality of embedded systems for the product design including the first and second embedded components and the bus using a bill of material; and
include connection types for transmitting messages between embedded systems in the bill of material.

6. A data processing system comprising:
a processor; and
an accessible memory, the data processing system particularly configured to:
display at least one message object associated with a first embedded component, wherein the first embedded component is embedded within a product built in accordance with the product design;
associate said at least one message object with a signal object using a compatibility list that defines component relationships in the product design; and
send the signal object to a second embedded component associated with the signal object and embedded within the product using a bus that provides a connection between the first embedded component and the second embedded component,
wherein the first and second embedded components are different engine controller units and wherein sending the signal object causes the second embedded component to perform an action associated with the message object,
wherein selection of the first embedded component to be included in the product design is made without knowledge of messages requirements in the product design, and
wherein the first and second embedded components are developed by different entities.

7. The data processing system of claim 6, wherein the data processing system is further configured to:
represent a plurality of embedded systems for the product design including the first and second embedded components using a bill of material; and
include connection types for transmitting messages between embedded systems in the bill of material.

* * * * *